(12) United States Patent
Frooninckx et al.

(10) Patent No.: US 9,801,401 B2
(45) Date of Patent: Oct. 31, 2017

(54) AQUEOUS DISPERSION OF FRUCTAN-CONTAINING PARTICLES, METHOD OF PREPARATION AND USE

(71) Applicant: TIENSE SUIKERRAFFINADERIJ, N.V., Tienen (BE)

(72) Inventors: Kim Martha Jozefa Frooninckx, Neerbeek (NL); Francois Alice Alphonso Heroufosse, Nil Saint Vincent (BE)

(73) Assignee: TIENSE SUIKERRAFFINADERIJ N.V. (BE)

( * ) Notice: Subject to any disclaimer, the term of this patent is extended or adjusted under 35 U.S.C. 154(b) by 61 days.

(21) Appl. No.: 14/550,374

(22) Filed: Nov. 21, 2014

(65) Prior Publication Data
US 2015/0079245 A1   Mar. 19, 2015

(30) Foreign Application Priority Data

Apr. 23, 2008 (EP) .................................... 08007836
May 30, 2008 (EP) .................................... 08009894

(51) Int. Cl.
*A23L 1/09* (2006.01)
*C08B 37/00* (2006.01)
(Continued)

(52) U.S. Cl.
CPC ................. *A23L 1/09* (2013.01); *A23L 29/30* (2016.08); *C08B 37/0051* (2013.01);
(Continued)

(58) Field of Classification Search
None
See application file for complete search history.

(56) References Cited

U.S. PATENT DOCUMENTS 2,007,971 A * 7/1935 Jackson ................. C13K 11/00
127/30
4,613,377 A * 9/1986 Yamazaki .............. C13K 11/00
127/39
(Continued)

FOREIGN PATENT DOCUMENTS

EP      0 627 490      4/1994      .............. C12P 19/14
EP      0 787 745      8/1997
(Continued)

OTHER PUBLICATIONS

Office Action issued in related U.S. Appl. No. 12/922,418, dated Sep. 10, 2015 (20 pgs).
(Continued)

*Primary Examiner* — Patricia A George
(74) *Attorney, Agent, or Firm* — Hayes Soloway P.C.

(57) ABSTRACT

An aqueous dispersion of fructan-containing particles, wherein the $D_{50}$ of the fructan-containing particles lies between 2 μm and 50 μm and the solids content of the aqueous dispersion lies between 61 wt. % and 80 wt. %. Also described is a process for the preparation of an aqueous dispersion of fructan-containing particles comprising: bringing fructan and water together to form a mixture; optionally hydrolyzing a portion of the fructans in the mixture, such that at the end of this step between 5 wt. % and 25 wt. % of all fructans in the mixture are essentially non-soluble at room temperature; optionally bring the mixture into contact with a purification agent, followed by removal of the purification agent from the mixture; and concentrating the mixture such that the solids content lies between 61 and 80%.

18 Claims, 2 Drawing Sheets

Figure 1:
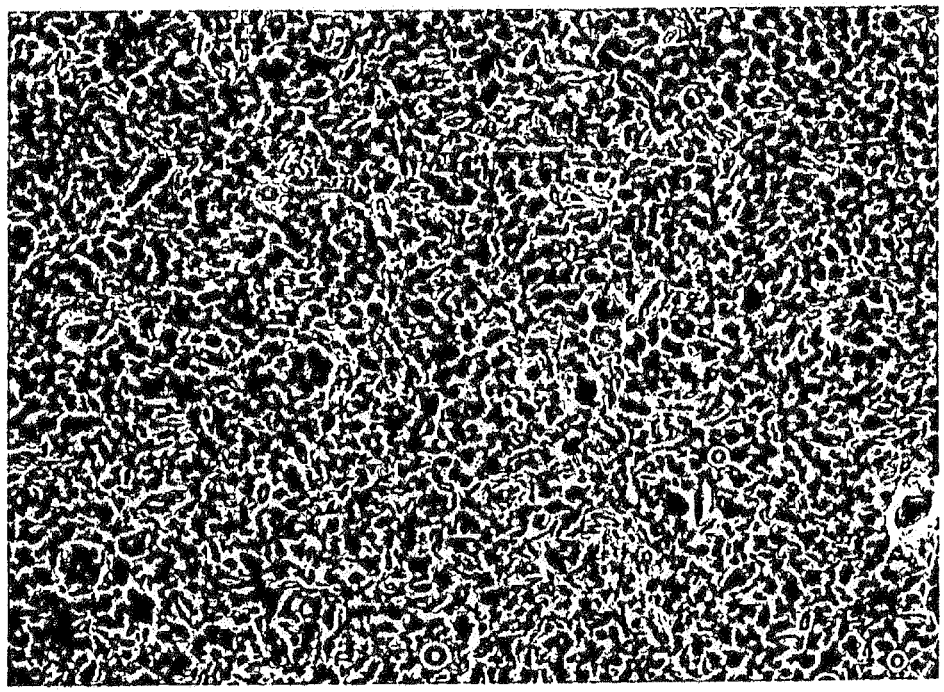

(51) Int. Cl.
*C08L 5/00* (2006.01)
*A23L 29/30* (2016.01)

(52) U.S. Cl.
CPC ............ *C08B 37/0054* (2013.01); *C08L 5/00* (2013.01); *A23V 2002/00* (2013.01)

(56) References Cited

U.S. PATENT DOCUMENTS

| | | | | |
|---|---|---|---|---|
| 4,871,574 | A | * | 10/1989 | Yamazaki ............... A23L 19/10 426/471 |
| 5,478,732 | A | | 12/1995 | Kunz et al. .................... 435/101 |
| 5,561,226 | A | * | 10/1996 | Nitsch ................. C08B 37/0051 424/750 |
| 5,656,317 | A | | 8/1997 | Smits et al. ................... 426/453 |
| 5,840,884 | A | | 11/1998 | Lis et al. ...................... 536/127 |
| H2095 | H | | 1/2004 | Young ........................... 426/658 |
| 2002/0098272 | A1 | | 7/2002 | Silver ............................ 426/578 |
| 2007/0184177 | A1 | | 8/2007 | Harrison et al. ............. 426/660 |
| 2008/0175977 | A1 | | 7/2008 | Harrison et al. ............. 426/659 |
| 2009/0086615 | A1 | | 4/2009 | Zavaliche et al. ........... 369/283 |
| 2011/0039002 | A1 | | 2/2011 | Verkoeijen et al. .......... 426/541 |

FOREIGN PATENT DOCUMENTS

| | | | | |
|---|---|---|---|---|
| WO | WO 89/09288 | | 10/1989 | ............ C13K 13/00 |
| WO | WO 91/04342 | | 4/1991 | ............ C13K 13/00 |
| WO | WO 96/01849 | | 1/1996 | ............ C08B 37/18 |
| WO | WO 97/31544 | | 9/1997 | ............... A23L 1/05 |
| WO | WO 00/78817 | | 12/2000 | ............. C08B 37/18 |
| WO | WO 2005/058258 | | 6/2005 | ............... A61K 7/06 |
| WO | WO 2006/024100 | | 3/2006 | ............. C08B 37/18 |
| WO | WO 2007/128559 | | 11/2007 | ............. C08B 37/18 |
| WO | WO 2008/107153 | | 9/2008 | ............... A61K 8/73 |

OTHER PUBLICATIONS

Office Action issued in related U.S. Appl. No. 12/922,418, dated Mar. 1, 2015 (13 pgs).
U.S. Appl. No. 12/922,418, filed Sep. 13, 2010, Frooninckx et al.
Intl Search Report, PCT/EP2009/002877, dated Aug. 19, 2009, (5 pgs).
Roberfroid: Introducing inulin-type fructans; British Journal of Nutrition (2005), 93, Suppl. 1, S13-S25.
Office Action issued in related U.S. Appl. No. 12/922,418, dated Sep. 20, 2012 (10 pgs).
Office Action issued in related U.S. Appl. No. 12/922,418, dated Mar. 25, 2013 (11 pgs).
Office Action issued in related U.S. Appl. No. 12/922,418, dated Aug. 7, 2013 (12 pgs).
Office Action issued in related U.S. Appl. No. 12/922,418, dated Feb. 6, 2014 (15 pgs).
Office Action issued in related U.S. Appl. No. 12/922,418, dated Aug. 18, 2014 (18 pgs).
Office Action issued in U.S. Appl. No. 12/922,418, dated Oct. 17, 2016 (18 pgs).
Office Action issued in U.S. Appl. No. 12/922,418, dated Jan. 25, 2017 (18 pgs).

* cited by examiner

AQUEOUS DISPERSION OF FRUCTAN-CONTAINING PARTICLES, METHOD OF PREPARATION AND USE

This application is a divisional application of co-pending U.S. application Ser. No. 12/922,418 filed Sep. 13, 2010 as a 371 of PCT/EP2009/002877, filed Apr. 21, 2009, and claims priority, both of which are incorporated herein by reference in their entirety.

BACKGROUND OF THE INVENTION

The invention relates to an aqueous dispersion of fructan-containing particles, to a method of preparing an aqueous dispersion of fructan-containing particles, and to uses thereof.

Aqueous dispersions of fructan-containing particles are as such known. An example of such a dispersion is typically created when a fructan having a limited solubility in water, such as for example inulin, in particular when inulin chains having a degree of polymerisation of at least 11 are present, is mixed with water.

A frequently observed disadvantage of such known dispersions is that they are not stable, in the sense that sediments are formed upon standing. Another frequently observed disadvantage of such dispersions is that they are too viscous and/or that gel formation has taken place, so that it is no longer possible to handle the dispersion as one would want with a liquid system, e.g. through pumping.

BRIEF DESCRIPTION OF THE PRIOR ART

U.S. Pat. No. 5,840,884 relates to a method for controlling and/or modifying the morphology of inulin. Using this method, inulin can be produced having, as desired, a predominately needle-like morphology or a predominately obloid-type morphology. The controlled morphology inulin of the present invention (i.e., needles, obloids, or combinations thereof) can be used in low-fat and/or fat-free viscous food products where the inulin acts as a fat mimetic. By controlling the morphology of inulin used in such food products, better control of organoleptic and physical properties of the food product can be obtained.

WO 96/01849 A relates to a fractionated polydisperse carbohydrate composition having the following definition: an av. DP which is significantly higher than the av. DP of a native polydisperse carbohydrate composition, significantly free of low molecular monomers, dimers, and oligomers, significantly free of impurities chosen among the group consisting of colourings, salts, proteins and organic acids, significantly free of technological aids such as solubility affecting products.

US H2095 H relates to an inulin/colloidal hydrolyzed cellulose composition as a fat substitute.

WO 97/31544 A relates to a gel composition of water, substantially linear polymeric monosaccharide and insoluble material exhibiting exceptional gel strength, thermal stability and organoleptic properties that may be utilized as a fat mimetic in food products. A preferred manufacturing method includes microparticulating the composition at elevated temperatures.

EP-A-0 627 490 relates to a method for the preparation of long-chain inulin with simultaneous isolation of glucose and fructose, where an aqueous crude inulin suspension with a crude inulin concentration of 20-70% by weight is treated enzymatically with hydrolases at temperatures of 30-70° C., whereupon the short-chain fractions are degraded to mono- and disaccharides and the long-chain inulins are separated from the mono- and disaccharides and converted into the dry form, to the products prepared in this way and to the use thereof.

It is the objective of the present invention to reduce or even eliminate the said disadvantage.

SUMMARY OF THE INVENTION

The said objective is achieved by the provision of an aqueous dispersion of fructan-containing particles, wherein the $D_{50}$ of the fructan-containing particles lies between 2 µm and 50 µm and wherein the solids content of the aqueous dispersion as a whole lies between 61 wt. % and 80 wt. %.

An advantage of the present invention is that the aqueous dispersions of fructan-containing particles can be stable, i.e. do not form sediments upon even prolonged storage of several weeks or even months, while at the same time the dispersion may be handled as a liquid system such as for example through pumping.

The present invention relates to an aqueous dispersion. As meant herein, the term dispersion means a system comprising two phases whereby one phase is continuous and the other phase is discontinuous, whereby the discontinuous phase is distributed throughout the continuous phase. The discontinuous phase in the aqueous dispersion according to the invention is present in the form of particles. As meant herein, the term particles encompasses solid entities but also liquid entities. If the particles are solid, then they may be present in various forms such as a solid particles, agglomerates, or (semi)-porous multi-crystals.

Generally speaking, dispersions may contain a dispersant, i.e. compound or mixture of compounds that is separately added and specifically serves to help create or to stabilize a dispersion and/or influence particle size. Although a dispersant may be used in the dispersion according to the invention, it is preferred that this is not done, so that in this preferred embodiment the aqueous dispersion according to the invention contains essentially no dispersant.

An important characteristic of a dispersion is its stability, defined as the lack of tendency of the dispersed particles to separate out, coagulate or settle. As meant herein, a dispersion is defined as being stable if no significant separation, coagulation or settling is observed for at least 24 hours after the dispersion has been prepared, whereby the dispersion is kept at a temperature lying between 15° C. and 30° C. A dispersion may be characterised as very stable if no such separation, coagulation or settling is observed for at least one week after the dispersion has been prepared, whereby the dispersion is kept at a temperature lying between 15° C. and 30° C.

The particles in the aqueous dispersion of the invention contain, or preferably even consist essentially of, fructans. The term fructan as used herein has its common meaning of being a generic term that relates to a polydisperse carbohydrate material consisting of oligosaccharides and/or polysaccharides having mainly fructosyl-fructose links with optionally a glucose starting moiety. The meaning of fructan encompasses the more specific compounds inulin—wherein the fructosyl-fructose links are mainly of the $\beta(2\rightarrow1)$ type—and levan—wherein the fructosyl-fructose links are mainly of the $\beta(2\rightarrow6)$ type.

As used herein, the meaning of the term inulin encompasses also the compounds known as oligofructoses; typical of oligofructoses is that they are inulins whereby the degree of polymerisation (DP) ranges from 2 to 10.

As used herein, the terms oligofructose and fructooligosaccharide (FOS) are considered to be synonyms.

Preferably, the fructan in the aqueous dispersion according to the invention contains inulin or even consists essentially only of inulin. It is furthermore preferred that the aqueous dispersion according to the invention contains essentially only water and fructans.

As is known, fructans such as for example inulin can have a certain solubility in water, whereby the solubility shows a clear dependency on the DP. Thus, while inulin having a DP of 10 or lower has a good to very good solubility in water at room temperature, it is also observed that at room temperature inulin compounds having a DP of 11 or more become gradually increasingly insoluble, whereby it is also known that it may take several hours or even up to 24 hours before an equilibrium establishes itself. Furthermore, it is known that the solubility of inulin shows a dependency on temperature, whereby the solubility increases with increasing temperature. Moreover, it is also known that the solubility of compounds such as fructans has threshold concentration limits, below which a fructan—even of very high DP—may be said to be in solution in any case.

Consequently, in case a polydisperse inulin product having DP's below 10 and also DP's of 11 or more is mixed with water, it can be observed that the inulin will go partly into solution, and may partly remain insoluble—and then be present as particles. Within the framework of the present invention, the term dispersions also encompasses systems having both dissolved and non-dissolved fructans.

The terms 'consist(ing) essentially of' or 'essentially only' and equivalents have in relation to a composition the usual meaning that in addition to compounds that are mandatory—such as fructans—other compounds may also be present, provided that the essential characteristics of the composition are not materially affected by their presence.

The fructans in the aqueous dispersion according to the invention should be able to form a dispersion; thus, at least a portion of the fructans used should have a limited or even virtually no solubility in water when evaluated at a temperature lying between 15° C. and 30° C. and at a concentration of the said portion in water of 5 wt. % or more and after a standing time of 24 hours. For those fructans whereby solubility varies significantly with DP, this requirement may be understood to mean that a portion of the fructans has a DP that is such—usually, this means: sufficiently high—to promote insolubility at room temperature. Preferably, therefore, at least 5 wt. % of the aqueous dispersion as a whole consists of insoluble fructans, e.g. having a degree of polymerisation (DP) of at least 11. The said wt. % is preferably at most 25 wt. %; this has the advantage that the viscosity of the aqueous dispersion can remain sufficiently low so as to still allow good handling of the aqueous dispersion.

The aqueous dispersion according to the invention contains particles. It was found that the size of the particles should be within certain limits in order to ensure that the dispersion is both stable and can be handled as a liquid.

It was found that fructan-containing particles are in practice seldom perfectly spherical. In order to still be able to define the size of the particles, an approach often used in practice is used here too, namely to express the size of the particles in terms of the measurement result of laser diffraction particle sizing. As is known, this measurement provides as result the diameter of the sphere that yields an equivalent light scattering pattern to the particle being measured; to a good approximation this corresponds to the sphere of equivalent average cross-sectional area. Further details on the size measurement are given below in the Examples.

Since the fructan-containing particles will often in practice have not one size but rather show a size distribution, it was found helpful to express the size of the particles in the $D_{50}$ parameter. As is known, the expression that a collection of particles has a '$D_\alpha$ of $\beta$' means that a wt. % of all particles in the collection has a size of at most $\beta$. According to the invention, it is preferred that the $D_{50}$ of the fructan-containing particles lies between 2 μm and 50 μm. More preferably, the $D_{50}$ of the fructan-containing particles is at least 3 μm, 4 μm, 5 μm, or 6 μm; and at most 45 μm, 40 μm, 35 μm, 30 μm, 25 μm, 20 μm or 15 μm. Furthermore, it is preferred that the value of $D_{10}$ lies between 0.5 μm and 5 μm, preferably between 1, 1.25 or 1.5 μm and 1.75, 2.0, 2.5, 3 or 4 μm; this has the advantage that the amount of very small particles remains limited; it was found that, thereby the stability— and/or handling characteristics of the aqueous dispersion according to the invention are further improved.

As indicated above, the fructan in the aqueous dispersion according to the invention preferably contains inulin or even consists essentially only of inulin. This has as an advantage compared to inulin in powder form that inulin can be incorporated much easier in many liquid or gel-like foodstuffs such as dairy products like milk and yoghurt, and fruit preparations.

For reasons of economy, it will be usually advantageous when the aqueous dispersion has a relatively high solids content; in this way, it is a.o. avoided that a large amount of water is being transported unnecessarily. Thus, it is preferred that between 5 wt. % and 25 wt. % of the aqueous dispersion as a whole consists of fructans in particle form; this means for fructans like inulin that compounds with a degree of polymerisation (DP) of at least 11 are present. In order to increase the fructan content of the aqueous dispersion even further, while still achieving the objectives of stability and ease of handling, it is preferred that the aqueous dispersion also contains dissolved fructans. In the case of inulin, this would mean that the aqueous dispersion also contains oligofructose. The total amount of fructans, dissolved or not, in the aqueous dispersion should be such that the solids content of the aqueous dispersion as a whole lies between 61 wt % and 90 or 85%, preferably between 62, 63, 64, or 65% and 80%.

As used herein, the term 'solids content' of an aqueous dispersion has the often-used meaning of being the result of a measurement in which the weight evolution of a sample is monitored upon drying under vacuum at 70° C. Further details on the determination of solids content are given below in the Examples.

In a particularly preferred embodiment, the solids content of the aqueous dispersion as a whole is at least such that this contributes significantly to its microbiological stability. Microbiological stability as used herein means the resistance against undesired growth of micro-organisms. As the skilled person knows, the precise percentage at which the solids content should be will depend on the type of fructan used and may be determined easily through routine experiments in which the microbiological stability of aqueous dispersions having various solids content values is evaluated. In case the fructan in the aqueous dispersion consists primarily or even essentially of inulin, the solids content value preferably is at least 62, 64, 66, or even 68%; the value is preferably at most 80, 78, 76, 75, 74, 73 or even 72%.

If the solids content is sufficiently high so as to obtain an acceptable microbiological stability, or if the aqueous dispersion for other reasons—such as the certainty that it will be used very quickly after having been prepared—does not need to worry about this phenomenon, then the aqueous dispersion of the invention may do without the presence of a preservative. Thus, while in general the aqueous dispersion of the invention may contain a preservative, it is preferred that the aqueous dispersion does not contain a preservative. As indicated above, this holds in particular when the solids content is sufficiently high so as to assure microbiological stability already thereby.

In various preferred embodiments according to the invention, the aqueous dispersion will contain fructans that are in solution as well as fructans in particle form. In these embodiments it is preferred that the number-averaged degree of polymerisation ($\overline{DP}$) of all fructans in the aqueous dispersion lies between 4.5 and 15, more preferably between 5.0 and 10, most preferably between 5.5 and 9. The $\overline{DP}$ is the value which corresponds to the total number of saccharide units (G and F units) in a given inulin sample divided by the total number of inulin molecules in said sample, without taking into account the monosaccharides glucose (G) and fructose (F) and the disaccharide sucrose (GF) which are possibly present in the sample. The average degree of polymerisation is commonly determined by the method described by De Leenheer et al. in Starch/Stärke, 46, (5), 193-196, (1994) and in Carbohydrates as Organic Raw Materials, Ed. H. Van Bekkum et al. for CRF, Wageningen, The Netherlands, Vol. III, 67-74, (1996).

In a preferred embodiment of the invention, the particle size and solids content of the aqueous dispersion are chosen such, preferably by means of routine experiments within the ranges as given, that the aqueous dispersion has a viscosity lying between 5 and 50000 Pa·s, preferably between 10 and 40000 Pa·s, more preferably between 20 and 30000 Pa·s. This has the advantage that an optimum balance between stability and handling characteristics may be achieved.

It was found that if an aqueous dispersion has a rather high viscosity, e.g. above 500 or 1000 Pa·s but still within preferred ranges, it may be necessary to increase the shear stress with which the viscosity measurement is executed. This should be done without applying so much shear that a destructive effect on the aqueous dispersion is sorted; as the skilled person knows, an oscillation sweep measurements with controlled and increasing shear stress applied to a sample will typically provide the necessary information.

The aqueous dispersion according to the invention may be prepared by simply bringing suitable fructan-containing particles and water together and mixing them thoroughly. In doing so it should be ensured—for example by selecting the raw material such that compounds of non-soluble DP are present—that at least some of the particles do not dissolve or not dissolve completely. Furthermore, it should be ensured, e.g. through selection or through sieving techniques, that the raw material comprises particles that have—after having been mixed thoroughly with water—a $D_{50}$ lying between 2 µm and 50 µm. Also, it should be ensured that the solids content of the aqueous dispersion as a whole lies between 61 wt. % and 80 wt. %

In an alternative embodiment of the invention, the aqueous dispersion is prepared in a process comprising:
a) the step of bringing fructan and water together to form a mixture;
b) optionally a hydrolysis step, wherein a portion of the fructans in the mixture is hydrolysed, such that at the end of this step b) between 5 wt. % and 25 wt. % of all fructans in the mixture are essentially non-soluble at room temperature;
c) optionally a purification step, wherein the mixture is brought into contact with a purification agent, followed by removal of the purification agent from the mixture;
d) a concentrating step, wherein the mixture is concentrated, such that the solids content lies between 61 and 90 or 85%, whereby the aqueous dispersion is formed.

In step a) of the process according to the invention, a fructan and water are brought together to form a mixture. This step may be executed by mixing means that are as such known. Preferably the amount of water used to prepare the mixture is at least 5 wt. % more than as envisaged for the aqueous dispersion to be prepared, measured on the mixture as a whole. Preferably, the water content in the mixture is between 5% and 500% higher, more preferably between 10% and 300% higher than as envisaged for the aqueous dispersion to be prepared. In one embodiment of the invention, step a) takes place in the form of an extraction step wherein fructans are extracted from a plant source in a known fashion. An example of a suitable plant source is chicory roots.

While it is important to ensure that at least a portion of the fructans are non-soluble in water at temperatures lying between 15° C. and 30° C., it may be that the said portion is so high that this could lead to aqueous dispersions that are too viscous to allow handling. It may thus be beneficial to execute hydrolysis step b). The hydrolysis of the fructan may be executed by known methods, such as acidic or enzymatic hydrolysis. In one embodiment, it is preferred to execute enzymatic hydrolysis. As is known, the enzymatic hydrolysis may be executed by combining the fructan and an inulinase under suitable conditions of temperature and pH. Preferably, the hydrolysis is carried out by means of an enzyme having predominantly or even essentially only endo-inulinase activity.

While it may be beneficial to execute a hydrolysis step, it must be ensured that still a portion of fructan compounds remains that are essentially insoluble at temperatures lying between 15° C. and 30° C. Thus a hydrolysis step should be carried out such that at the end of this step b) at least 5 wt. % and at most 25 wt. % of all fructans then in the mixture are essentially non-soluble at room temperature. Room temperature is defined herein as being 21° C. The requirement that the hydrolysis step is carried out without too much reduction of DP may be fulfilled by stopping the hydrolysis reaction timely. This may be achieved by means as such known, such as for example a rise in pH and/or temperature.

Due to the nature of the raw materials used, it may be that the mixture as formed in step a) or b) needs to be purified. In that case, a purification step c) may be executed wherein the mixture is brought into contact with a purification agent, followed by removal of the purification agent from the mixture. The purification agent may contain an ion-exchange resin and/or activated carbon. The removal of the purification agent may be executed by means as such known, e.g. by ensuring that the purification agent is present in a fixed form such as a fixed bed and by letting the mixture flow along the purification agent.

In the process according to the invention, step a)—or possibly b) or c)—is followed by concentrating step d). In this step the mixture is concentrated, such that the solids content lies between 61 and 90 or 85%, whereby the aqueous dispersion is formed. As used herein, the term 'concentration' means a reduction of water content. The concentration may be carried out by means as such known, such as for example evaporation or membrane separation.

Evaporation may be carried out in for example a multiple effect falling film evaporator, or in a rising film evaporator, or in still another type of evaporating apparatus or combination thereof.

Aside from ensuring that the solids content of the mixture is increased, step d) also typically leads to the formation of (additional) crystals. In this process, it may be desirable to influence the crystal formation in order to ensure that the aqueous dispersion according to the invention is formed. In an embodiment of the invention, the influencing of crystal growth is achieved in step d) by means of cooling and/or adding of an inoculating compound to the mixture.

It was found in particular that a high degree of control over the temperature during concentration step d) can be instrumental in achieving a stable aqueous dispersion according to the invention having good handling characteristics. Thus if step d) is executed by means of evaporation, then it is preferred that already during or immediately after step d) the temperature is brought quickly to a level below 40° C., more preferably below 30° C. If an inoculating compound is added to the mixture, it is preferred that the inoculating compound consists of fructan particles. More preferably, the fructan and the inoculating compound consist essentially of inulin.

Upon completion of the concentrating step, the aqueous dispersion of the invention is formed, and may be used as such or after a desirable further treatment such as bringing the aqueous dispersion to a temperature between 15 and 30° C. by means of e.g. a heat exchanger or a flash cooling apparatus.

During or subsequent to the concentrating step d), it may be preferred to execute a shearing step e). In this step, a shear force is applied to the mixture or aqueous dispersion. An advantage of applying shear is that the formation of particles or agglomerates that are rather large is inhibited or prevented, thereby reducing the tendency of particles to coagulate and/or sediment; the said inhibition or prevention contributes to the stability of the aqueous dispersion. A further advantage of applying shear is that it can lead to an increase of particles that can act as inoculating particles. Due to the said advantages, shearing step e) can be a useful step in controlling the particle sizes and particle size distribution in the aqueous dispersion of the invention so that desirable values of $D_{50}$ and $D_{10}$ within the ranges as mentioned above are achieved. Shearing step e) generally serves to (further) increase the stability of the aqueous dispersion of the invention.

Surprisingly, it was found that shearing step e) can also reduce or even fully prevent any tendency of the aqueous dispersion to spontaneously form a non-pumpable gel. In a preferred embodiment, if shearing step e) is executed subsequent to concentrating step d), step e) is done at most one week after completion of step d). Preferably, step e) is done at most 24 hours or even 8 hours after completion of step d); step e) may also be done within 1 hour after, or immediately after completion of step d).

An embodiment of the invention, therefore, relates to an aqueous dispersion of fructan-containing particles whereby the aqueous dispersion is obtainable by a process comprising at least the step e) whereby step e) may be executed after steps a), optionally b), optionally c) and d) have been carried out. Alternatively, the aqueous dispersion of fructan-containing particles according to the invention can be obtainable by executing step e) on the mixture as formed in step a).

Shearing step e) may be done by means that are as such known to the person skilled in the art. One example of execution of shearing step e) is through agitating the mixture in a vessel whereby the vessel is equipped with agitating means such as a stirrer. The specific conditions of execution of shearing step e) will, as the skilled person will appreciate, depend on the circumstances of the case in practice; it is noted hereby that the duration of shearing step e) is preferably at least 5 minutes and lies in a preferred embodiment between 1 hour and 48 hours, more preferably between 12 and 36 hours. It is noted further that the execution of shearing step e) will be more effective if care is taken—by means known as such to the skilled person—that the shearing action is effectively 'felt' throughout the aqueous dispersion, also when the viscosity of the dispersion is rather high.

Another example of execution of shearing step e) is to push the aqueous mixture through a static mixer, whereby the static mixer should be designed such that sufficient shear is created in and preferably throughout the aqueous dispersion.

The invention relates moreover to the use of the aqueous dispersion according to the invention in human nutrition or animal nutrition. In principle, any use of inulin as such is also suitable for the aqueous dispersion of the invention. Due to the liquid nature of the aqueous dispersion according to the invention, it is particularly preferred to use it in cases where the dosing of a liquid presents advantages and/or where the end application is also a gel or a liquid such as dairy applications, drinks, and fruit preparations.

The invention will be illustrated by means of the following Figures and Example, without being limited thereto.

Figure 2:
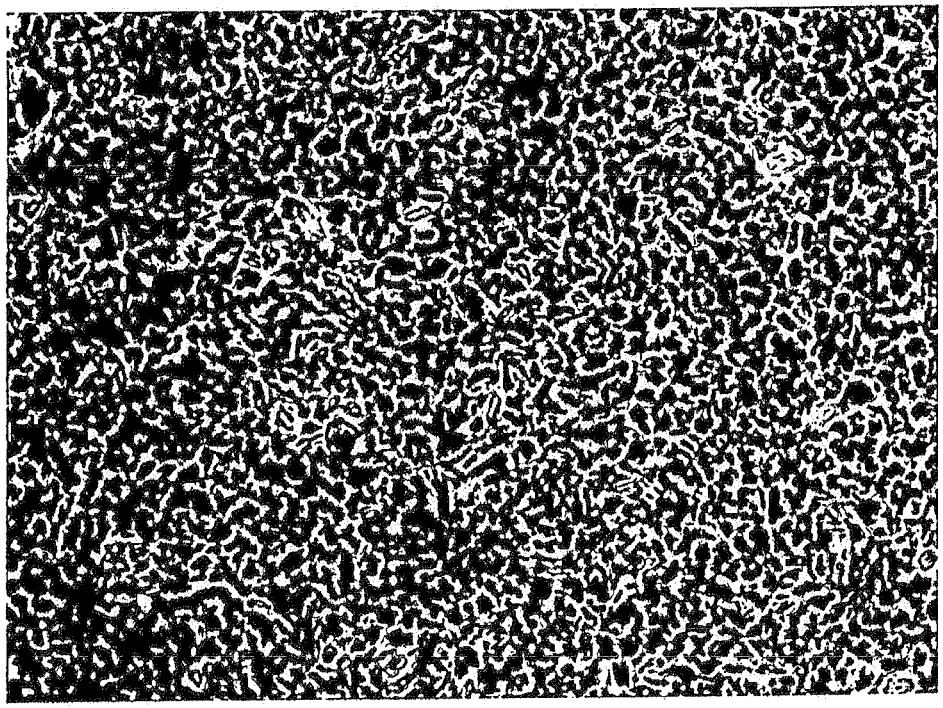
Figure 3:
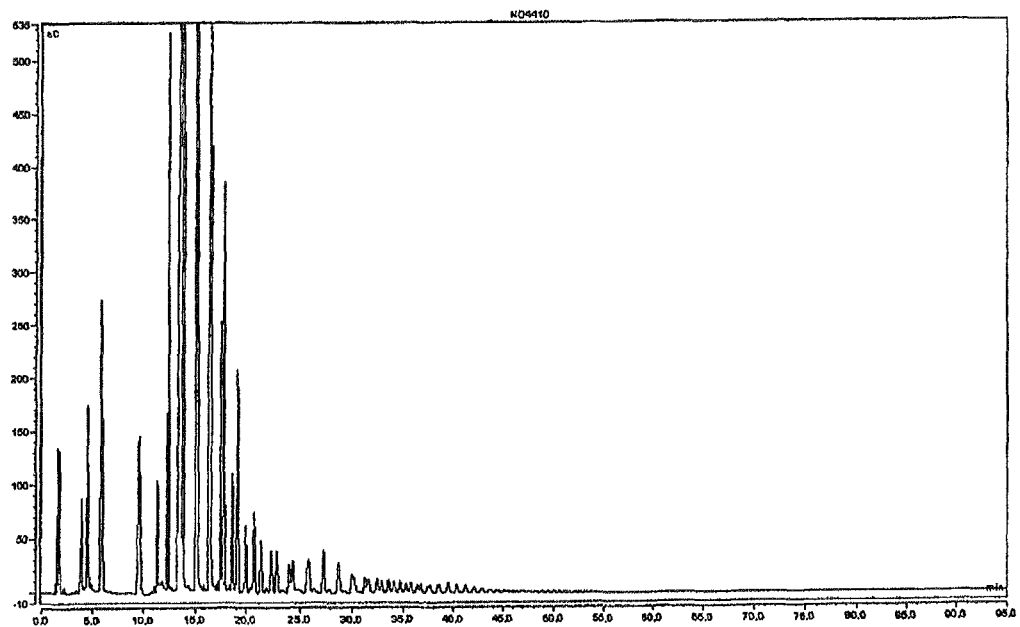
Figure 4:
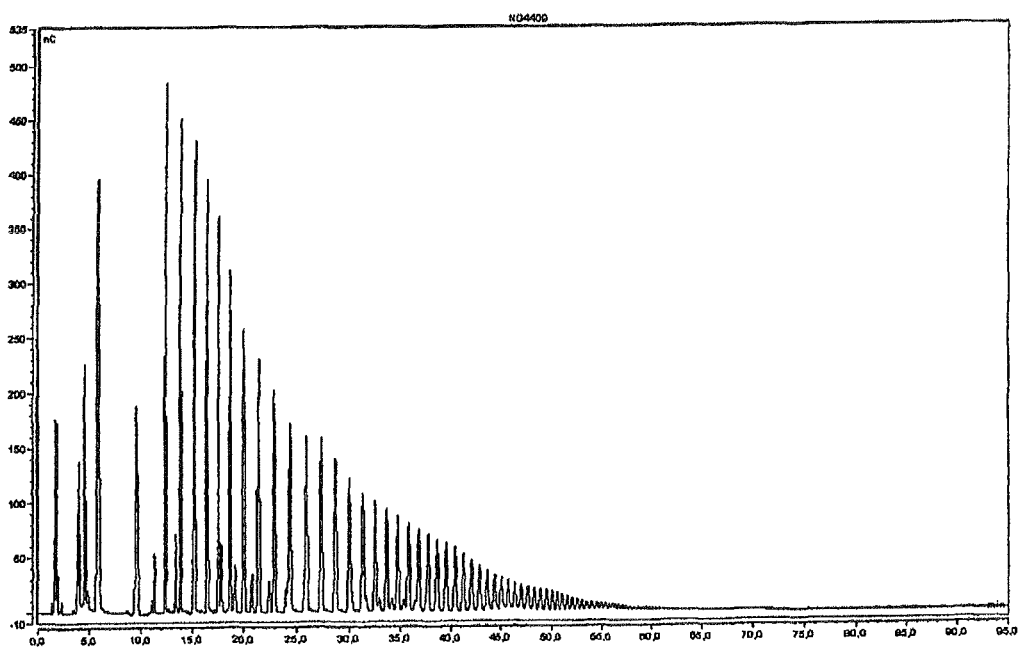

In the Figures, FIG. 1 is a photograph of the aqueous dispersion according to Example 1 the invention; this photograph of a sample taken from the top of a container that had stood undisturbed for four months;

FIG. 2 is a photograph of the same aqueous dispersion as in FIG. 1; this photograph, however, is of a sample taken from the bottom of the container;

FIG. 3 presents a Dionex HPAEC (high pressure anion exchange chromatography) chromatogram of the inulin contained in the aqueous dispersion of the invention of Example 1;

FIG. 4 shows a Dionex chromatogram of a native inulin extracted from chicory.

EXAMPLE 1

Measurement of Solid Contents

The determination of solids content was done via measuring the weight difference of a sample before and after vacuum drying. The as such known procedure comprised the following steps:

Provision of a small amount of sea sand;
Putting the sea sand in a vacuum dryer at 70° C. and at a vacuum of 3500 Pa during 4 hours; weighing of the sea sand, the result being P1
Adding the sample of which the solids content is to be determined to the sea sand;
Weighing the thus prepared sample, the result being P2, and putting it in the vacuum dryer at 70° C. and at a vacuum of 3500 Pa during 20 hours;
Weighing the sample after drying, the result being P3;
Calculating the solids content according to the formula: 100×(P3−P1)/(P2−P1)

Viscosity Measurements

The viscosity was measured in a Rheometer Bohlin CV O50 apparatus. The shear stress was controlled at 1.5 Pa unless noted otherwise. The measurement was conducted at a temperature of 25° C., with no pre-shear being applied and after one hour and a half stabilisation time before measurement.

Measurements of Particle Size

The determination of particle size was done by means of a Mastersizer 2000 apparatus (supplier: Malvern), with Scirocco dry powder feeding unit or a Hydro 2000S unit for liquid samples. The sample was first diluted to a solids content of 60 wt. % and then centrifuged for 90 min at 13000 rpm to separate the suspended particles. After removal of the supernatans, the particles are re-suspended in water to a refractive index of 1.39 and used directly for particle size measurement. The Mastersizer is capable of determining sizes in the 0.02 μm to 2000 μm. As is common in this apparatus, a measurement result is an average of 5,000 measurements done over a period of 5 seconds.

Preparation of Mixture and Aqueous Dispersion

A mixture was formed by bringing 840 kg of inulin—product Orafti GR, supplier Beneo-Orafti—in water such that the inulin was present in 20 wt. %. Inulin GR was characterised by having a number-averaged DP of 12; 70 weight % of the inulin GR had a DP of 11 or more.

The temperature of the mixture was brought to 60° C. The mixture was subjected to a UHT step at 140° C. for 30 seconds.

For the purpose of executing a hydrolysis step, the mixture was then fed into a reactor; the temperature was brought to 60° C., and the pH was lowered to 5.4 by means of $H_2SO_4$. Subsequently, 280 ml of an endo-inulinase enzyme (Novozymes® 960, batch KNN105) was added. At these conditions, the mixture was allowed to react for 20 hours. The reaction was brought to an end by first raising the pH to 8 with NaOH, then the temperature to 90° C. for 15 minutes; these conditions led to de-activation of the enzymes.

The mixture was cooled to 20° C., in order to execute the purification step: this was done by guiding the mixture through a column with a fixed-bed anion exchange resin type XA100RSCL. Subsequently the pH of the mixture was brought to 6 and the mixture was led over activated carbon (Norit® ROX 0.8) and filtered (0.2-0.4 μm hole size).

The concentration step was executed on the mixture by using a falling film evaporator, in 4 steps, until a solids content of 72% was achieved. In doing so, the aqueous dispersion was formed and immediately cooled to 22° C. with a tube and shell heat exchanger.

Analysis of Aqueous Dispersion

An analysis on the aqueous dispersion as prepared showed that it had the following properties:
Solids content: 72%
Viscosity: 60 Pa·s
$D_{10}$: 2.3 μm
$D_{50}$: 8.0 μm
16 wt. % of carbohydrates, i.e. 11.5 wt. % of the dispersion as a whole, had a DP 11 or more, as measured via Gas Chromatography
DP: 6. See also FIG. 3, whereby it is noted that the peak at retention time of 20.0 minutes corresponds to a DP of 10.
Stability: very stable; no sedimentation or agglomeration after 4 months of standing, see also FIGS. 1 and 2 where both the absence of agglomeration can be seen as well as the non-occurrence of sedimentation.
No gel formation was observed, the aqueous dispersion was—and remained—pumpable

EXAMPLE 2

An aqueous dispersion according to the invention was prepared in the same fashion as in Example 1, with however the following differences:
The amount of enzyme added was reduced from 280 ml to 150 ml;
Subsequent to the concentration step, the aqueous dispersion was transferred to a vessel equipped with a stirrer and there stirred for 24 hours (shearing step e)).
The aqueous dispersion had the following characteristics:
Solids content: 70%
$D_{10}$: 1.5 μm
$D_{50}$: 6.0 μm
25 wt. % of the carbohydrates in the aqueous dispersion had a DP of 11 or more as measured via Gas Chromatography
Stability: very stable
No gel formation was observed, the aqueous dispersion was—and remained—pumpable

EXAMPLE 3

An aqueous dispersion according to the invention was prepared in the same fashion as in Example 1, with however the following differences:
The amount of enzyme added was reduced from 280 ml to 130 ml;
Subsequent to the concentration step, the aqueous dispersion was transferred to a vessel equipped with a stirrer and there stirred for 24 hours (shearing step e)).
The aqueous dispersion had the following characteristics:
Solids content: 70%
30 wt. % of the carbohydrates in the aqueous dispersion had a DP of 11 or more as measured via Gas Chromatography
Viscosity: 12500 Pa·s, whereby the viscosity measurement was done with a higher shear stress of 10 Pa (instead of 1.5 Pa) due to the high viscosity of the aqueous dispersion
Stability: very stable
No gel formation was observed, the aqueous dispersion was—and remained—pumpable

The invention claimed is:

1. A process for preparation of an aqueous dispersion of fructan-containing particles, comprising:
   a) the step of bringing fructans including fructans in solid particle form having a $D_{50}$ of between 2 μm and 50 μM and water together to form a mixture;
   b) a hydrolysis step, wherein a portion of the fructans in the mixture is hydrolyzed, such that at the end of this step b) between 5 wt. % and 25 wt. % of all fructans in the mixture are in solid particle form and essentially non-soluble in the water at room temperature;
   c) a concentrating step, wherein the mixture is concentrated, such that a solids content lies between 61 and 80%; and
   d) during or subsequent to step c) apply shear to the mixture whereby an aqueous dispersion is formed.

2. The process according to claim 1, wherein in step c) an inoculating compound is added to the mixture.

3. The process according to claim 2, wherein during or immediately after step b) the temperature is brought to a level below 40° C.

4. The process according to claim 1, wherein shear step d) is executed in a stirred vessel and for a period of time of between 5 minutes and 48 hours.

5. The process according to claim 2, wherein during step c) a shearing step d) is done, wherein shear is applied to the mixture.

6. The process according to claim 3, wherein subsequent to step c) a shearing step d) is done, wherein shear is applied to the mixture.

7. The process according to claim 1, further comprising a purification step, between step a) and step b), wherein the mixture is brought into contact with a purification step followed by removal of the purification agent from the mixture.

8. The process according to claim 7, wherein the purification agent contains an ion-exchange resin and/or activated carbon.

9. A process for preparation of an aqueous dispersion of an aqueous dispersion of fructan-containing particles, comprising:
   a) the step of bringing fructans including fructans in particle form having a $D_{50}$ between 2 μm and 50 μm and water together to form a mixture;
   b) a hydrolysis step, wherein a portion of the fructans in the mixture is hydrolysed, such that at the end of this step b) between 5 wt. % and 25 wt. % of all fructans in the mixture are in particle form and essentially non-soluble in the water at room temperature;
   c) a purification step, wherein the mixture is brought into contact with a purification agent, followed by removal of the purification agent from the mixture;
   d) a concentrating step, wherein the mixture is concentrated, such that a solids content lies between 61 and 80%; and
   e) during or subsequent to step d) apply shear to the mixture whereby an aqueous dispersion is formed.

10. The process according to claim 9, wherein in step d) an inoculating compound is added to the mixture.

11. The process according to claim 10, wherein during or immediately after step d) the temperature is brought to a level below 40° C.

12. The process according to claim 9, wherein shear step e) is executed in a stirred vessel and for a period of time of between 5 minutes and 48 hours.

13. The process according to claim 9, wherein step c) is executed and whereby the purification agent contains an ion-exchange resin and/or activated carbon.

14. The process according to claim 10, wherein during step d) and shearing step e) is done, wherein shear is applied to the mixture.

15. The process according to claim 11, wherein subsequent to step d) a shearing step e) is done, wherein shear is applied to the mixture.

16. The process according to claim 10, wherein step c) is executed and whereby the purification agent contains an ion-exchange resin and/or activated carbon.

17. The process according to claim 11, wherein step c) is executed and whereby the purification agent contains an ion-exchange resin and/or activated carbon.

18. The process according to claim 12, wherein step c) is executed and whereby the purification agent contains an ion-exchange resin and/or activated carbon.

* * * * *